United States Patent [19]

Bell

[11] Patent Number: 4,618,082

[45] Date of Patent: Oct. 21, 1986

[54] LUGGAGE RACK

[75] Inventor: James C. Bell, Stratford, Conn.

[73] Assignee: Oliver Industries, Inc., Orange, Conn.

[21] Appl. No.: 738,085

[22] Filed: May 24, 1985

[51] Int. Cl.⁴ .............................................. B60P 9/04
[52] U.S. Cl. ..................................... 224/321; 224/326
[58] Field of Search ............... 224/309, 315, 320, 321, 224/322, 325, 326, 327; 410/105, 104

[56] References Cited

U.S. PATENT DOCUMENTS 4,323,182  4/1982  Bott ...................................... 224/321
4,473,178  9/1984  Bott .................................. 224/321 X
4,500,020  2/1985  Razor .................................... 224/321

Primary Examiner—Stephen Marcus
Assistant Examiner—David Voorhees
Attorney, Agent, or Firm—McCormick, Paulding & Huber

[57] ABSTRACT

A vehicle luggage rack with parallel slats secured in mounting strips to a surface has a cross member made up of two sculptured stanchions and a cross rail that can be adjusted between several predetermined positions but not readily removed. One-piece fastener and tether means hold the stanchions in place, and also hold tie downs in place on at least the outside slats.

20 Claims, 14 Drawing Figures

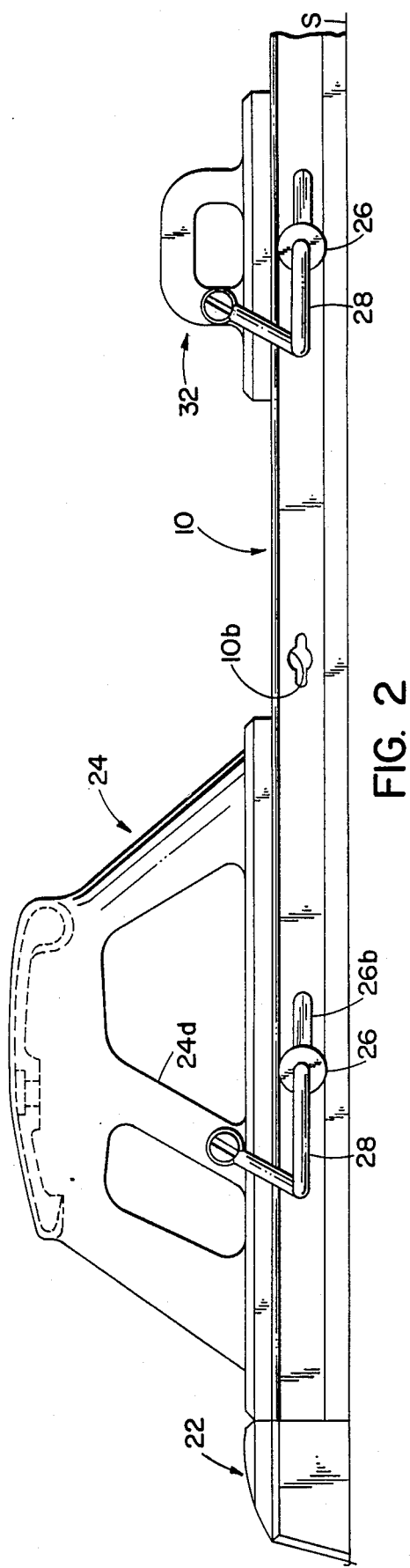
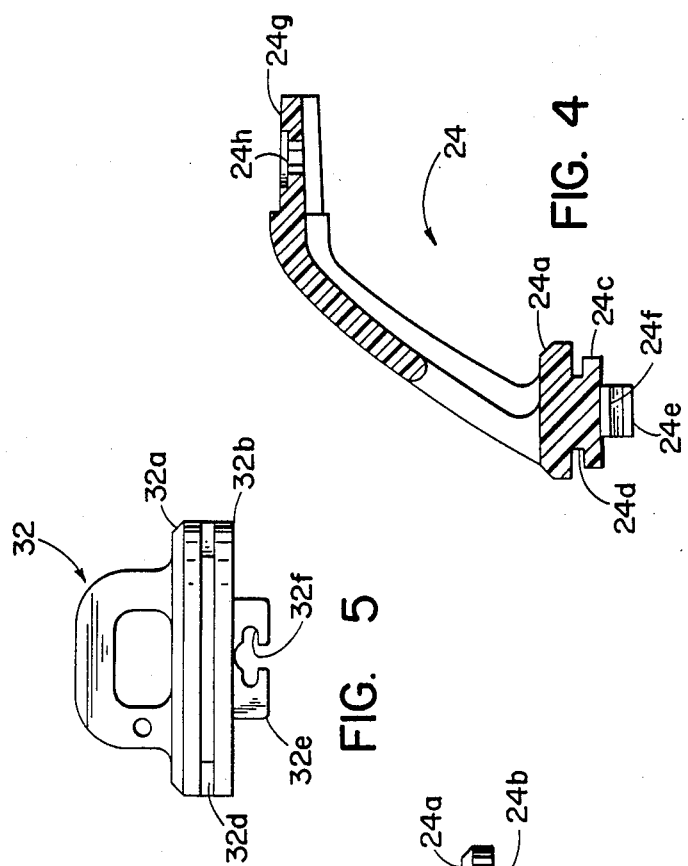
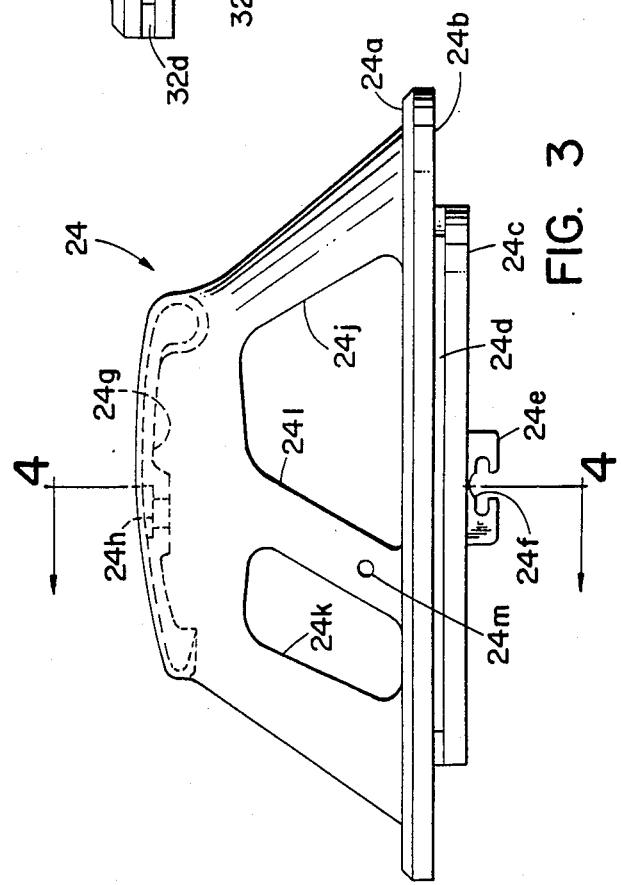

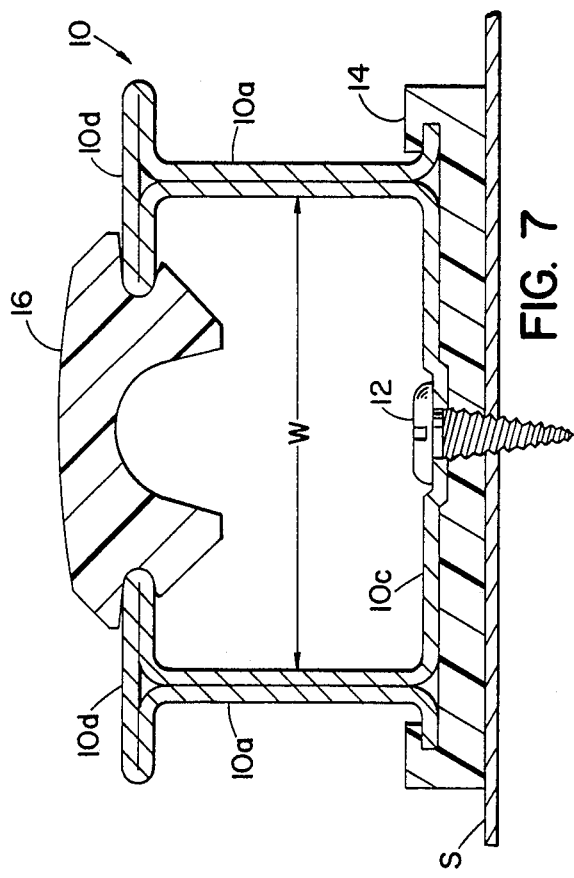

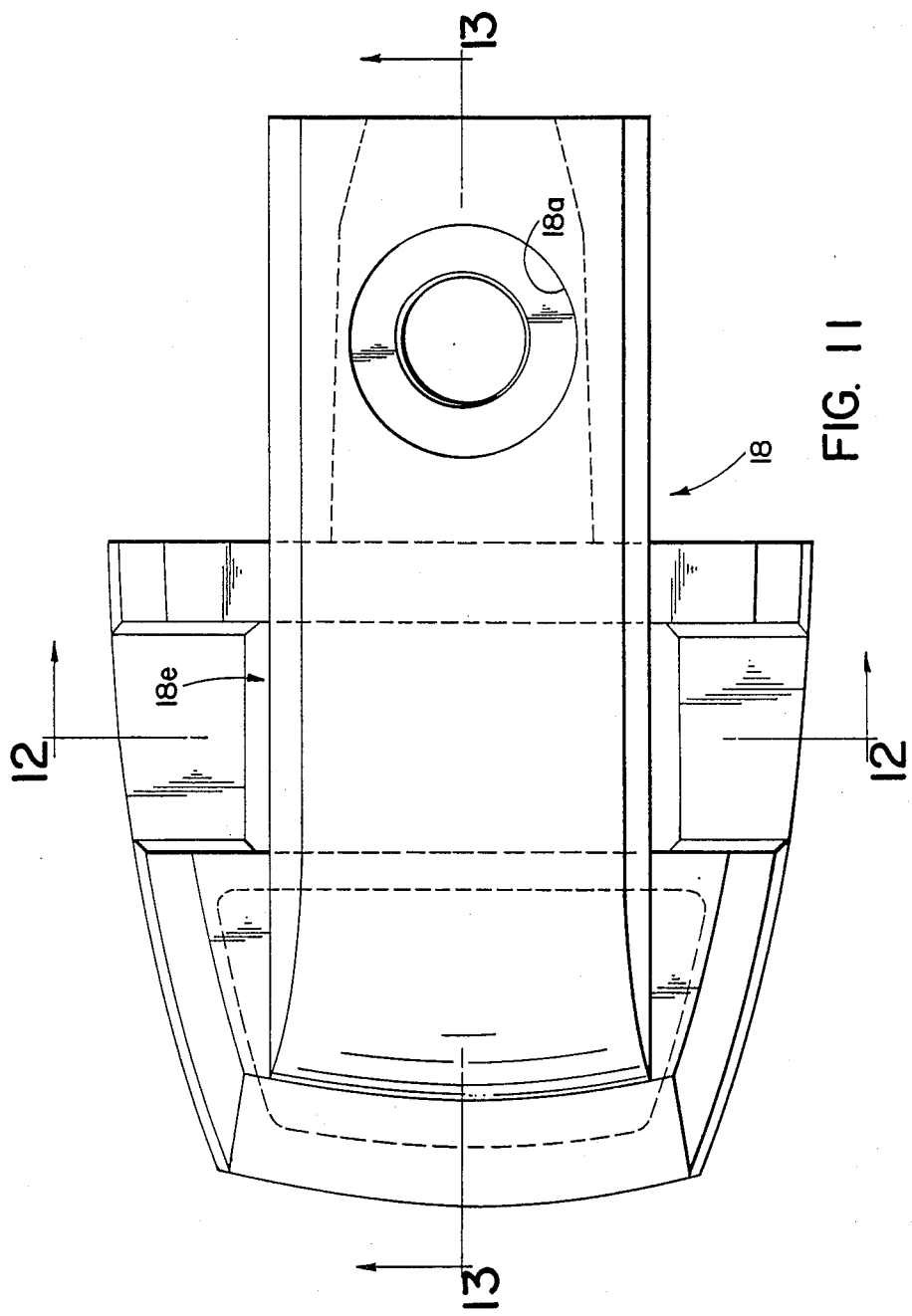

LUGGAGE RACK

SUMMARY OF INVENTION

This invention relates generally to automotive luggage racks and deals more particularly with an adjustable luggage rack of the type having elongated upwardly open channel defining slats located on mounting strips in spaced parallel relationship on the vehicle surface. Four stanchions are provided in these channels and support two cross rails above the vehicle surface.

Automotive luggage racks of the type utilizing two or more parallel slats generally take either one of two forms. Some such racks utilize removable cross rails so that the automobile owner can remove the cross rails when the rack is not in use. Such racks are shown in prior art U.S. Pat. Nos. 4,182, 471 and 4,099,658. The ready removability of the cross rails can be a disadvantage in that these elements of the luggage rack can be removed by unauthorized persons. Another type of luggage rack with elevated cross rail and longitudinally extending slats provided on the vehicle surface is that shown and described in prior art U.S. Pat. Nos. 4,162,755 and 4,323,182. The cross rail is provided in removable stanchions in these prior art patents and here again does not discourage unauthorized persons from disassembling these components of the luggage rack.

The general object of the present invention is to provide a simplified luggage rack configuration wherein longitudinally extending channel slats are provided on mounting strips on a vehicle surface, and with an improved stanchion configuration uniquely mounted to these slats such that the stanchions and cross rail are adjustable between predetermined positions along the slats but cannot be readily removed therefrom.

The foregoing results are achieved in the luggage rack of the present invention by providing a plurality of upwardly open channel shaped slats, the outermost pair of which slats are adapted to receive stanchions at selected locations so as to support one or more cross rails in elevated relationship to the vehicle surface. Certain of these slats are load bearing slats and the channel shaped opening is fitted with an insert or trim piece of extruded plastic. At least two of these upwardly open channel shaped slats are fitted with stanchions which have bases slidably mounted in the slat channels. Grooves in the stanchion base slidably received inturned lips defined for this purpose in the slats, and non-threaded fasteners are provided to secure each stanchion in a predetermined position as dictated by aligned openings in the channel side walls themselves. Each non-threaded fastener is removable but tethered to the stanchion for the convenience of the user in adjusting the position of the stanchions and cross rails as required. The fastener has one end associated with the tether and integrally formed from a resilient plastic material having a memory. A pin portion of the fastener is adapted to assume a position in a key-shaped slot provided for this purpose in the slat side wall so as to avoid inadvertent removal. A manually engageable tab on the head end of the pin permits the user to rotate the pin portion of the fastener in the opening provided for it in the channel slat so as to allow removal of the fastener and permit repositioning of the cross rail and stanchions as required. Unique tie downs are also provide adjustably in these outermost channel shaped slats and are similarly fastened by tethered fastener pins just as are the stanchions. End fittings are provided on at least the two slats supporting the stanchions, which end fittings are designed to pervent removal of the stanchions by sliding them longitudinally outwardly of the slat channels. These end fittings preferably include tie down eyes for the convenience of the user in operating the luggage rack for the purpose intended.

BRIEF DESCRIPTION OF THE DRAWINGS

FIG. 2 is a side elevational view of the luggage rack illustrated in FIG. 1.

FIG. 3 is an elevational view of the stanchion shown in FIGS. 1 and 2.

FIG. 4 is a sectional view through the stanchion illustrated in FIG. 3.

FIG. 5 is an elevational view of the tie down element illustrated in FIGS. 1 and 2.

FIG. 6 is a vertical sectional through the tie down element of FIG. 1 being taken on the lines 6—6 of that view.

FIG. 7 is a vertical sectional view being taken generally on the line 7—7 of FIG. 1.

FIG. 7A is a vertical sectional view through one of the channel slat side wall openings.

FIG. 8 is a vertical section taken generally on the line 8—8 of FIG. 1.

FIG. 9 is an elevational view of the fastener and its integrally connected tether used to secure the stanchion and tie down in place.

FIG. 10 is a plan view of the fastener and tether illustrated in FIG. 9.

FIG. 11 is a plan view of an end cap provided on one of the slats not associated with the stanchion in FIG. 1.

DETAILED DESCRIPTION

Figure 1:
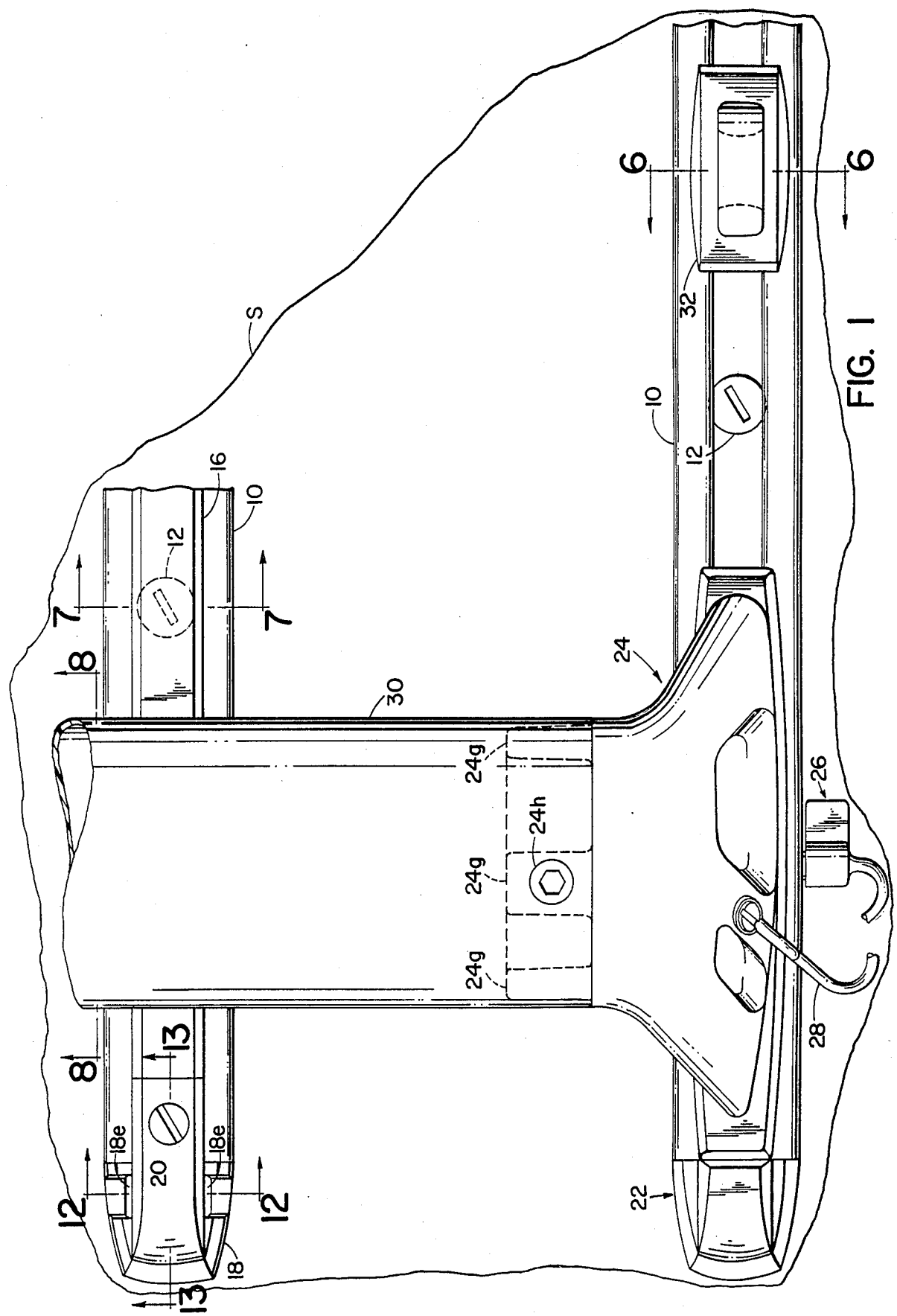
FIG. 1 is a plan view of one corner of a generally rectangular luggage rack embodying the present invention.

Turning now to the drawings in greater detail, and referring in partricular to FIG. 1, a luggage rack of the type adapted for mounting on either the roof or the trunk lid of a motor vehicle is shown in part in this plan view. The vehicle surface S may comprise any horizontally extending surface of the vehicle such as the roof or trunk lid, and the portion of the luggage rack illustrated comprises the right rear quarter or corner of a generally rectangular rack structure to be described in detail herein.

FIG. 2 shows the same right rear quarter of a luggage rack incorporating the present invention mounted on the surface S of a motor vehicle. In a luggage rack constructed in accordance with the present invention a plurality of parallel longitudinally extending slats 10, 10 are mounted to the vehicle surface as by sheet metal screws 12 in accordance with conventional practice. FIG. 7 shows the cross sectional configuration of these slats 10. Each slat 10 comprises a rolled stainless steel member which is formed from an initially flat sheet to define the upwardly open channel shaped configuration illustrated in FIG. 7. A plastic mounting strip 14 is provided between the channel 10 and the vehicle surface S in accordance with conventional practice. The channel shaped slat member 10 has laterally spaced side walls 10a, 10a which define a plurality of longitudinally spaced openings 10b, 10b best shown in FIG. 2, for a purpose to be described hereinafter. The channel shaped slat 10 includes base portion 10c defining a plurality of openings adapted to receive the sheet metal mounting screws 12 referred to previously. Each such opening for each sheet metal screw 12 may also include a recessed area to receive the head of the screw, as shown in FIG. 7, to provide clearance between the head of the screw and movable elements of the luggage rack to be described hereinafter. Finally, and still with reference to the channel shaped slat 10 the channel so defined can be seen from FIG. 7 to have a width W, with inwardly projecting lips defined by upper portions 10d of the channel 10 so that the upwardly open portion of the channel has a narrower width W. These inturned lips of the slat 10 define a track for slidably receiving luggage rack elements to be described. A trim piece 16 also of plastic material may be provided in such of the channel shaped slats 10 as serve solely as load support elements in the luggage rack, as for example the shorter of the two slats illustrated in FIG. 1. The outermost slats in the luggage rack of FIGS. 1 and 2 which will receive the slidably mounted components of the rack itself are preferably not fitted with such a trim piece 16.

Figure 12:
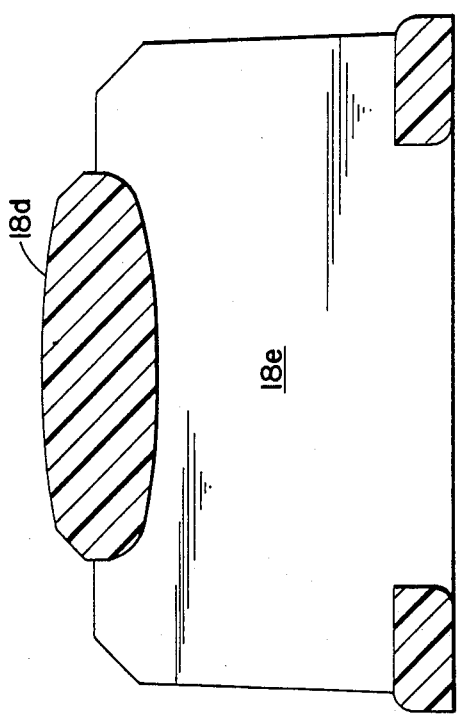
FIG. 12 is a vertical sectional view taken generally on the line 12—12 of FIG. 1 (and also on the line 12—12 of FIG. 11).

Still with reference to the elongated slats in the luggage rack depicted in FIGS. 1 and 2, the load bearing slat which includes trim piece 16 preferably has a plastic injection molded end cap 18 provided at its end, which end cap is held in place by a sheet metal screw 20 that passes through an opening provided for it in the end cap and through an opening in the channel shaped slat 10 so as to secure both the end cap and the slat to the vehicle surface. FIG. 11 shows this end cap 18 and the opening 18a for receiving the screw 20. The end cap 18 includes a tappered nose portion 18b and the underneath side, which does not show may be relieved as suggested at 18c. This end cap 18 also includes a latterally extending opening best shown in the sectional view of FIG. 12 such that a line can be passed through the opening to assist in tying down luggage or the like to the rack as installed on the vehicle. End cap 18 therefor serves not only to close the end of the channel in the slat 10 but also to serve as a tie down element of fixed configuraton without including any protuberance above the upper surface of the slat or at least of the trim piece 16 provided in the slat channel. In fact, the upper surface 18d of the end cap 18 is faired to fit the upper surface of the trim piece 16 referred to previously as shown in FIG. 2.

Figure 13:
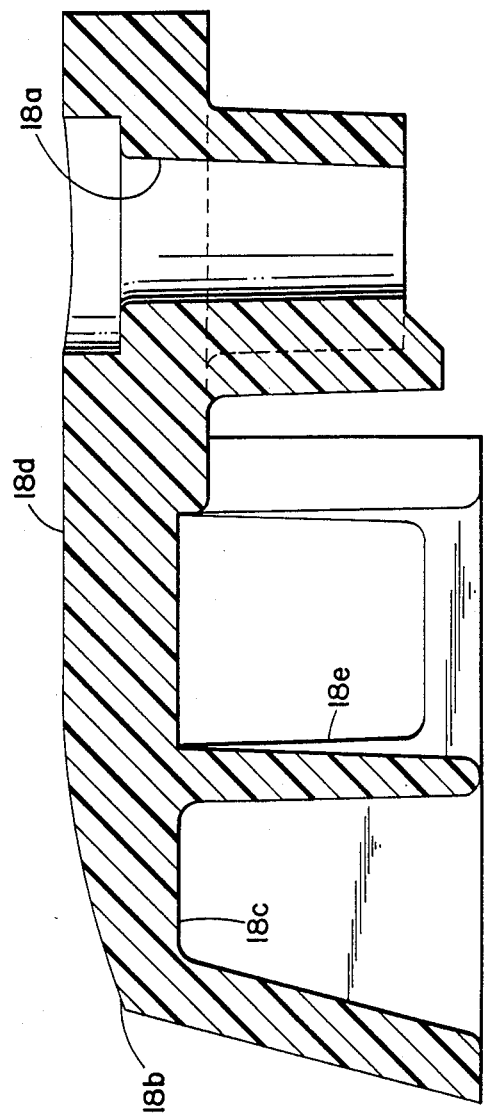
FIG. 13 is a vertical section taken generally on the line 13—13 of FIG. 11 (or the line 13—13 of FIG. 1).

The outermost channel shaped slats 10 of the luggage rack, that is those without the trim filler piece 16, may be fitted with end caps 22 which are generally similar to the end caps 18 referred to in the previous paragraph except for the fact that no through opening or laterally extending hole is provided for receiving a tie down line or the like. In such a case the downwardly open recess (not shown) defined for the purpose of conserving the plastic material in the end cap itself (18c in FIG. 13) may be of greater longitudinal extent than depicted in FIG. 13 for the end cap 18 with the tie down opening. The end cap 22 is otherwise similar to the end cap 18 of FIGS. 11, 12 and 13. Only the tie down eyelet 18e in the end cap 18 makes it different from end cap 22.

In a typical luggage rack four stanchions of the type indicated generally at 24 in FIGS. 1 and 2 will be provided adjacent the four corners of the generally rectangular luggage rack. These stanchions are of a left and right hand variety but are otherwise similar to one another and therefor only one such stanchion is shown in the drawings herein. Each stanchion 24 is secured to one of the outside channel shaped slats 10 by a single fastener 26 to be described in greater detail hereinafter. Such a fastener is required only to restrain the stanchions against movement longitudinally of an associated channel shaped slat 10. Each stanchion 24 includes a base 24a the underside of which base 24b rests upon the upper surfaces 10d of the channel 10. The base of each stanchion 24 further includes a lower portion 24c which is slidably received in the channel defined by the slat and longitudinally extending grooves 24d are provided between the lower portion 24c and the upper portion 24a so that these grooves slidably receive the inturned lips defined in the channel itself. Still with reference to the lower base portion of the stanchion 24 a depending lowermost portion 24e is provided with a through opening 24f corresponding in shape and geometry to the openings 10b provided in the channel 10. The purpose of these openings, which are preferably key shaped as shown in FIG. 3 will be described in greater detail below with reference to the tethered fastener used to secure the stanchion 24 in one of several predetermined positions as dictated by the openings 10b in the channel slat 10.

The upper portion of the channel 24 defines a laterally projecting support 24g that is adapted to receive a cross rail of the type indicated generally at 30 in FIGS. 1 and 8. This projecting support 24g has itself a cross sectional configuration best shown in broken lines in FIG. 3 to receive the air foil shaped cross rail 30 best shown in FIG. 8. Actually, the projection 24g is preferably defined in three parts as best shown in broken lines in FIG. 1 in order to conserve the plastic material from which the stanchion 24 is injection molded in the preferred embodiment. The center portion of the projection 24g preferably includes an opening 24h for receiving a threaded insert such that a screw fastener can be provided through the air foil shaped cross rail and more particularly through a bottom opening 30a provided for this purpose in the cross rail 30 so as to anchor the cross rail end to the stanchion as shown in FIG. 1.

The stanchion 24 is itself sculptured to define an air foil shape having a leading and trailing edge. Openings 24j and 25k are provided in the stanchion 24 to conserve plastic in the injection molded stanchion part itself, and also to serve as convenient openings through which lines can be passed for securing luggage or the like to the rack. A small opening 24m in the center strut portion 24l of the stanchion 24 serves as a convenient anchor for the tether 28 to be described. The tether 28 retains, for convenient use, the fastener 26 that secures the stanchion 24 and its associated cross rail to the channel shaped slat 10.

Turning now to a more detailed description of the tie down element 32 also shown in FIGS. 1 and 2 adjacent to but spaced from stanchion 24, FIGS. 5 and 6 illustrate this element of the luggage rack in some detail. Several such tie down elements 32 are preferably provided between adjacent stanchions 24 on each of the elongated outermost channel shaped slats 10 so as to assist the vehicle owner in tying down luggage or the like to the rack. Each such tie down element 32 is fabricated in one-piece from injection molded plastic material similar to that utilized in fabricating the stanchion 24. The tie down element 32 includes a base portion 32a, a lower portion 32b is slidably received in the channel defined in the slat 10. Grooves 32d on either side of the base 32a receive the inturned lips on the channel 10 as suggested in FIG. 6. A lowermost portion 32e of the tie down base is adapted to receive the fastener to be described which will restrain the tie down 32 from sliding movement and provide it at one of several locations as defined by the openings 10b in the channel shaped slat 10. FIG. 6 shows such a fastener in pertinent part as comprising a hand held portion 34a, a pin portion 34b and radially outwardly projecting tabs 34c that serve to retain the fastener in the position shown as a result of self spring means to be described and defined adjacent to the hand held portion 34a.

Turning now to a more complete description of the fastener and associated tether means FIGS. 9 and 10 illustrate a preferred form comprising a one-piece element 34 injection molded from a plastic material of the type having a reset memory inherent in it, such as rigid polypropylene. This element 34 includes a portion 26 which can be gripped by the user to insert the fastener portion in the form of pin 34b, in aligned openings as referred to previously in the channel shaped slat and either the stanchion 24 or tie down element 32. The pin portion of the fastener 26 is illustrated at 34b in FIGS. 9 and 10 and this view also shows the radially outwardly projecting tab means 34c referred to previously. Also shown in this view at the base end of the pin 34b are resilient wings 26a which serve as self-springs defined by the plastic material itself such that insertion of the pin portion 34b into the aligned openings as provided for it will serve to hold tabs 34c in an orientation such that they will not inadvertently permit fastener and pin to be withdrawn. It is noted that the side walls of the channel 10 may be indented slightly in the area of these aligned openings so as to further assure that inadvertent loosening or removal of the fastener is effectively prevented (see FIG. 7A).

FIG. 7A illustrates the innermost end of the fastener portion of the integrally formed fastener and tether means used to secure the stanchion and tie downs on an associated channel shaped slat 10. As there shown the pin portion 34b of the fastener has tab means 34c in diametrically opposed relationship adjacent the tip of the pin 34b and in the position shown these tabs 34c reside in detents 10e defined in the outside of the wall portion 10a of the slat 10. These detents 10e are formed by upsetting the area adjacent the hole 10b through which the pin 34b extends. It will be apparent that rotation of the pin portion 34b through approximately 90 degrees is required for withdrawal of the pin from its associated opening in the slat 10.

Still with reference to the integrally formed combination fastener and tether means illustrated in FIGS. 9 and 10 the fastener has head portion indicated generally at 26 which has an integrally formed handle portion 26b that serves to facilitate rotation of the pin means 34b in order to assist in insertion or removal of the fastener. Integrally connected to the head portion 26 of the fastener is a serpentine tether 28 terminating in an eyelet 28a such that the fastener and associated tether can be conveniently attached to either the stanchion or the tie down as required and as referred to previously. Thus, the same fastener and tether means is provided for securing both the stanchion 24 and the tie down element 32 in a position associated with one of the openings 10b provided for this purpose in the channel shaped slat.

As so constructed and arranged the luggage rack of the present invention provides a convenient system for securing luggage or the like to a generally horizontally extending vehicle surface. The cross members including two stanchions and a cross rail are readily adjustable through a range of predetermined positions but are not removable from the channel shaped slats provided on the vehicle surface. Tethered pin type fasteners are provided for securing the stanchions in position and these integrally formed fasteners also serve to secure tie down elements to the same predetermined positions on the cross rail as dictated by the openings provided for this purpose in these rails or slats. Each tie down element is itself integrally formed from a single piece of plastic, preferably by an injection molded process. The stanchions are also formed in the same manner. Finally, the fastener elements themselves are formed from a single plastic molding process so that both the tether and fastener are of one-piece construction.

I claim:

1. A luggage rack for a vehicle surface comprising at least two upwardly open channel shaped slats adapted for attachment to such a surface in spaced parallel relationship to one another, each slat having a base and parallel side walls spaced laterally to define on elongaged channel of width (W), longitudinally extending inturned lips integrally connected to said side walls such that said lips define a top opening for the channel of smaller lateral dimension than the interior width (W) of the slat channel, stanchions slidably mounted in said slat channels, each stanchion having a base with a lower portion slidably received inside said channel and having grooves to receive said inturned lips, non-threaded fasteners for said stanchions, each stanchion fastener including a pin adapted for insertion axially into aligned openings in said channel side walls and in said stanchion base lower portion, and means carried by said stanchion fastener to selectively restrict said pin against axial movement out of said aligned openings to prevent slidable movement of said stanchion in its channel.

2. The luggage rack of claim 1 further characterized by a cross bar extending laterally between two stanchions so provided on said two spaced apart channel shaped slats on such a surface, said two stanchions having upper portions secured to opposite ends of said cross bar respectively to support said cross bar above the vehicle surface.

3. The luggage rack of claim 1 further characterized by end caps for closing the ends of said channel shaped slats, and a resilient filler trim provided in certain of said slats, said trim defining side grooves to receive said inturned slat lips.

4. The luggage rack of claim 1 further characterized by plastic molded tie down elements, each element having an upper loop portion, said element also including a integral base with a lower portion slidably received inside said channel of one of said slats, said base also having integrally defined grooves to receive said inturned lips, a non-threaded fastener for each said tie down element, each tie down fastener including a pin adapted for insertion axially into aligned openings in said channel side walls and in said tie down element base lower portion, and means carried by said fastener to selectively restrict said pin against axial movement out of said aligned openings to prevent slidable movement of said tie down element in its channel.

5. The luggage rack of claim 1 further characterized by tether means for each stanchion fastener, said tether means having one end connected to said stanchion and the other end to said pin of said stanchion fastener.

6. The luggage rack of claim 5 further characterized by end caps for closing the ends of said channel shaped slats, and a resilient filler trim provided in certain of said slats, said trim defining side grooves to receive said inturned slat lips.

7. The luggage rack of claim 5 further characterized by plastic molded tie down elements, each element having an upper loop portion, said element also including a integral base with a lower portion slidably received inside said channel of one of said slats, said base also having integrally defined grooves to receive said inturned lips, a non-threaded fastener for each said tie down element, each tie down fastener including a pin adapted for insertion axially into aligned openings in said channel side walls and in said tie down element base lower portion, and means carried by said fastener to selectively restrict said pin against axial movement out of said aligned openings to prevent slidable movement of said tie down element in its channel.

8. The luggage rack of claim 5 further characterized by tether means for each tie down element, said tie down element tether means having one end connected to said tie down element and the other end to said pin of said tie down element fastener.

9. The luggage rack of claim 1 wherein said channel shaped slats have side walls defining a plurality of longitudinally spaced openings adapted to receive said fastener pins so that said stanchion can be secured in anyone of a plurality of positions along its associated slat.

10. The luggage rack of claim 9 wherein each aligned set of side wall openings in said slat side walls move particularly comprises aligned circular hole portions to so receive a cylindrically shaped portion of said fastener pin, said side wall openings further including at least one radially outwardly extending key slot communicating with said side wall openings, and at least one radially outwardly projecting tuberance adjacent the end of said cylindrical pin and insertable in said key slot only when said fastener pin has a predetermined angular alignment with said opening.

11. The luggage rack of claim 10 further characterized by tether means for each stanchion fastener, said tether means having one end connected to said stanchion and the other end to said pin of said stanchion fastener.

12. The luggage rack of claim 11 wherein said tether means is fabricated from a resilient thermoplastic material and with a memory set such that it normally biases said pin protuberance toward an angular position not in alignment with said key slot, and manually engageable tab means for rotating said pin so that said protuberance can be so aligned for insertion of said pin or for removal thereof.

13. The luggage rack of claim 12 wherein said fastener pin and said tab means are fabricated in one-piece from the same resilient thermoplastic material as that of said tether means.

14. The luggage rack of claim 13 further characterized by a cross bar extending laterally between two stanchions so provided on said two spaced apart channel shaped slats on such a surface, said two stanchions having upper portions secured to opposite ends of said cross bar respectively to support said cross bar above the vehicle surface.

15. The luggage rack of claim 13 further characterized by end caps for closing the ends of said channel shaped slats, and a resilient filler trim provided in certain of said slats, said trim defining side grooves to receive said inturned slat lips.

16. The luggage rack of claim 13 further characterized by plastic molded tie down elements, each element having an upper loop portion, said element also including a integral base with a lower portion slidably received inside said channel of one of said slats, said base also having integrally defined grooves to receive said inturned lips, a non-threaded fastener for each said tie down element, each tie down fastener including a pin adapted for insertion axially into aligned openings in said channel side walls and in said tie down element base lower portion, and means carried by said fastener to selectively restrict said pin against axial movement out of said aligned openings to prevent slidable movement of said tie down element in its channel.

17. The luggage rack of claim 13 further characterized by tether means for each tie down element, said tie down element tether means having one end connected to said tie down element and the other end to said pin of said tie down element fastener.

18. The luggage rack of claim 13 wherein said one-piece fastener pin and tether means also includes self spring means for acting on said fastener pin to urge it axially outwardly of said aligned openings.

19. The luggage rack of claim 13 wherein each of said tether means other ends defines a closed loop, and screw fasteners to attach said loops to said stanchions or tie down elements.

20. The luggage rack of claim 19 wherein said one-piece fastener pin and tether means also includes self spring means for acting on said fastener pin to urge it axially outwardly of said aligned openings.

* * * * *